US009190917B2

(12) United States Patent
Hwang et al.

(10) Patent No.: US 9,190,917 B2
(45) Date of Patent: Nov. 17, 2015

(54) ISOLATED FLYBACK CONVERTER FOR LIGHT EMITTING DIODE DRIVER

(75) Inventors: Jong Tae Hwang, Seoul (KR); Moonsang Jung, Seoul (KR); Daeho Kim, Seoul (KR); SooHyun Moon, Seoul (KR); JongHa Shin, Seoul (KR); MinHo Jung, Seoul (KR); JunHong Lee, Seoul (KR)

(73) Assignee: Dongbu HiTek Co., Ltd., Seoul (KR)

( * ) Notice: Subject to any disclaimer, the term of this patent is extended or adjusted under 35 U.S.C. 154(b) by 801 days.

(21) Appl. No.: 13/472,823

(22) Filed: May 16, 2012

(65) Prior Publication Data

US 2013/0063039 A1    Mar. 14, 2013

(51) Int. Cl.
*H05B 37/02* (2006.01)
*H02M 3/335* (2006.01)
*H05B 33/08* (2006.01)
*H02M 1/42* (2007.01)
*H02M 1/00* (2007.01)
*H02M 1/34* (2007.01)

(52) U.S. Cl.
CPC ....... *H02M 3/33523* (2013.01); *H05B 33/0815* (2013.01); *H02M 1/4258* (2013.01); *H02M 2001/0009* (2013.01); *H02M 2001/348* (2013.01); *Y02B 70/126* (2013.01)

(58) Field of Classification Search
CPC ............ H02M 3/33523; H02M 3/335; H02M 1/4241; H02M 1/4258; H02M 2001/348; H02M 2001/0009; H02M 1/34; Y02B 70/126; Y02B 70/12; H05B 37/02; H05B 33/0815

USPC ............ 315/209 R, 212, 223, 291, 302, 299, 315/307, 312

See application file for complete search history.

(56) References Cited

U.S. PATENT DOCUMENTS

| 2010/0141178 A1 | 6/2010 | Negrete et al. |
| 2011/0068700 A1* | 3/2011 | Fan ........................ 315/185 R |

FOREIGN PATENT DOCUMENTS

| JP | 2007-104881 | 4/2007 |
| JP | 2010-110157 | 5/2010 |
| JP | 2010-284031 | 12/2010 |

* cited by examiner

*Primary Examiner* — Tuyet Vo
*Assistant Examiner* — Henry Luong
(74) *Attorney, Agent, or Firm* — Andrew D. Fortney; Central California IP Group, P.C.

(57) ABSTRACT

An isolated flyback converter for an LED driver may include: (1) A snubber circuit configured to be connected to the primary side of a transformer. (2) A switching unit configured to have a source terminal and a drain terminal and configured to be turned on or off. (3) A control unit configured to detect a first input signal proportional to a fluctuation in the power supply voltage, detect a second input signal when the switching unit is turned off, generate a signal inversely proportional to the maximum value of the first input signal and multiply the generated signal to the second input signal, and control a peak current of the switching unit to be proportional to the multiplication result of the signal inversely proportional to the maximum value of the first input signal and the second input signal such that a secondary-side current of the transformer is maintained constant.

10 Claims, 16 Drawing Sheets

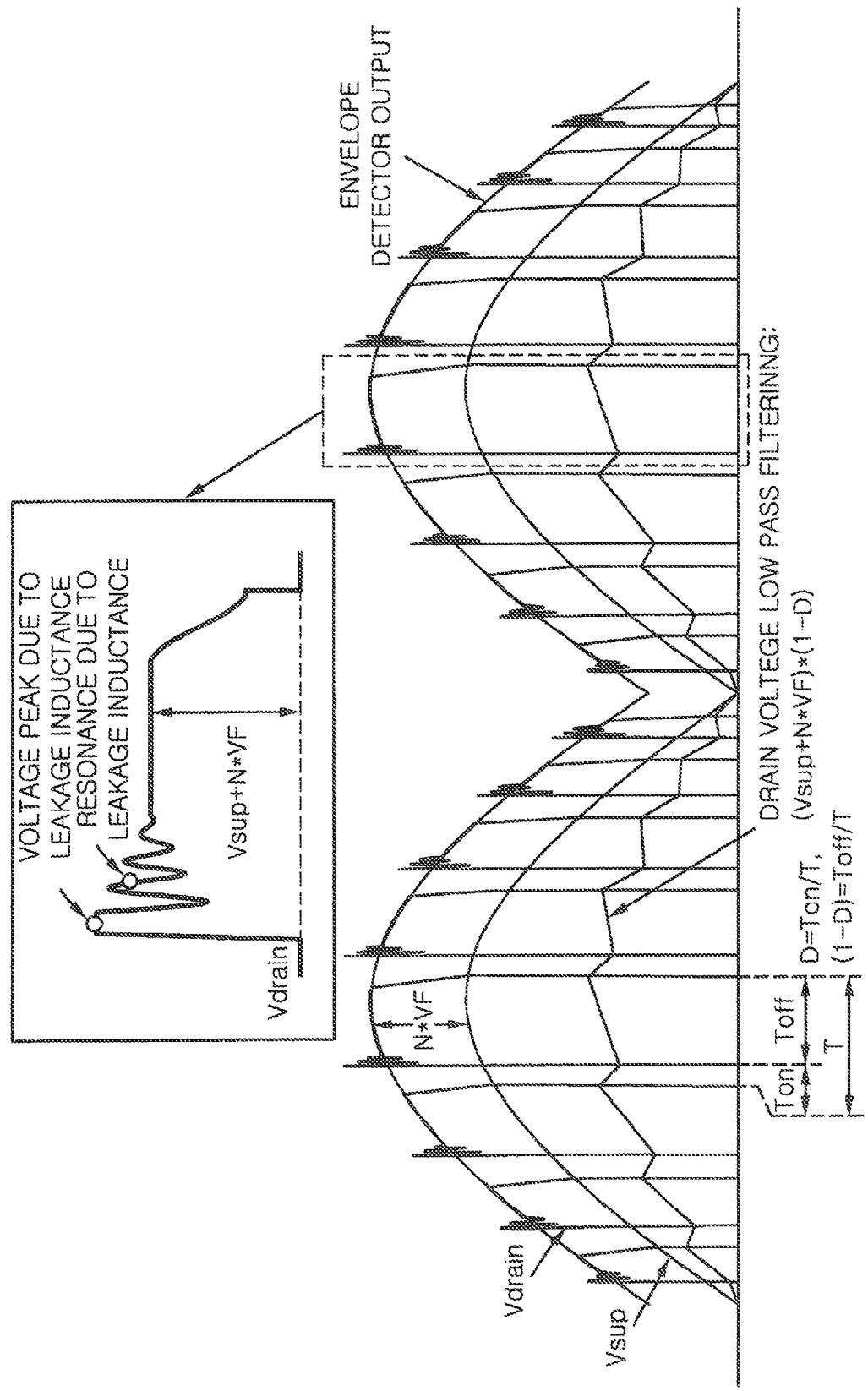

ISOLATED FLYBACK CONVERTER FOR LIGHT EMITTING DIODE DRIVER

The present application claims priority to Korean Patent Application No. 10-2011-0091052 (filed on Sep. 8, 2011), which is hereby incorporated by reference in its entirety.

BACKGROUND

LED lamps have advantages of relatively low power consumption and a relatively long lifetime compared to fluorescent lamps, incandescent lamps, three-wave fluorescent lamps, and similar light illumination devices. Many LED illumination devices are Direct Current (DC) devices. Since power supplied to consumers is normally Alternating Current (AC), to drive LED illumination devices, a converter may be necessary to convert AC into DC.

When LEDs are driven with alternating-current (AC) power (converted to DC), the LEDs may be classified as an isolation type or as a non-isolation type. For an isolation type LED device, there may be nominal risk of an electric shock because an LED load ground and an AC power supply ground are separated from each other. However, the manufacturing costs for an insulation type LED device may be relatively high.

FIG. 1 illustrates an isolation-type LED lamp driver circuit based on a flyback converter, in accordance with the related art. A flyback converter may be used because it requires only one high-voltage switching element and therefore the flyback converter has a simple structure that may be implemented at a relatively low cost.

AC power is full-wave rectified through a rectifier. A full-wave rectified signal may be converted to DC through a filter and then used. In some instances (as shown), a separated circuit may be needed to improve a power factor.

A flyback converter structure is used to transmit energy to the LED load insulated from the rectified power. In the flyback converter structure, energy is stored in a magnetizing inductance on the primary side of a transformer while a switch is turned on, and energy in the magnetizing inductance is transmitted to an LED load on the secondary side of the transformer when the switch is turned off.

A controller serves to control the on/off operation of the switch such that the secondary-side LED current has a desired value. In general, in order to control the secondary-side current, it is necessary to detect the secondary-side current and to feed back the detected secondary-side current to the controller. Since the primary side and the secondary side should be insulated from each other, it may be necessary to use an element (e.g. an opto-coupler), which transmits a signal through light that is used to give feedback to drive the current. In FIG. 1, a snubber serves to suppress high-voltage spark due to resonance caused by parasitic inductance when the switch is turned off. With this structure illustrated in FIG. 1, it is possible to control the LED current constant regardless of a fluctuation in the LED load, a fluctuation in the power supply voltage, or the like.

In some configurations, a flyback converter may have dimmer control leakage pull down using the flyback converter's main power device. The flyback converter's main power device may have a configuration in which a secondary-side current is predicted from a switching duty signal and a peak current transmitted from the primary side to the secondary side, and the peak of the secondary-side current is compared with a power supply voltage to be supplied, thereby controlling an LED current regardless of a fluctuation in an LED load or a fluctuation in power.

However, in an isolation-type LED lamp driver circuit using a flyback converter of the related art, it is necessary to provide an additional secondary-side current sensor circuit and an insulation element (e.g. an opto-coupler). Accordingly, isolation-type LED devices may have a relatively large system volume and/or relatively high manufacturing costs. From the viewpoint of cost reduction, it may be desirable to control the secondary-side current with no additional circuit in the isolated flyback converter. According, there may be a demand for a technique for controlling a current with no secondary-side additional circuit and with the function of shaping the secondary-side current in tune with an input voltage to minimize a phase difference and to improve a power factor. There may also be a demand for stably controlling a secondary-side current through only primary-side control, regardless of a fluctuation in the secondary-side load.

SUMMARY

Embodiments relate to an LED (Light Emitting Diode) driver circuit including an isolated flyback converter for an LED driver. In embodiments, an isolated flyback converter may be suitable for controlling the driving of an LED through only primary-side control without being affected by fluctuations in an LED load or fluctuations in the magnitude of a power supply voltage. In embodiments, an isolation-type LED driver has no current sensor and no opto-coupler.

In embodiments, an isolated flyback converter for an LED driver may be capable of improving a power factor and stably controlling a secondary-side current through only primary-side control with no additional circuit on a secondary side regardless of fluctuations in power or fluctuations in load.

In embodiments, an isolation-type converter for an LED driver may include at least one of: (1) A snubber circuit configured to be connected to the primary side of a transformer, to which a power supply voltage is supplied, which may prevent overvoltage or overcurrent. (2) A switching unit configured to have a source terminal connected to a switching current sensing resistor and a drain terminal connected to the snubber circuit and configured to be turned on or off. (3) A control unit.

In embodiments, the control unit may be configured to perform at least one of: (1) Detect a first input signal proportional to a fluctuation in the power supply voltage. (2) Detect a second input signal proportional to the envelope voltage of an output voltage of the switching unit when the switching unit is turned off. (3) Generate a signal inversely proportional to the maximum value of the first input signal and multiply the generated signal to the second input signal. (4) Control a peak current of the switching unit to be proportional to the multiplication result of the signal inversely proportional to the maximum value of the first input signal and the second input signal such that a secondary-side current of the transformer is maintained constant.

In embodiments, an isolated flyback converter may include a divider configured to attenuate the power supply voltage and supply the first input signal to the control unit. In embodiments, an isolated flyback converter may include an envelope detector configured to detect the envelope voltage of the output voltage of the switching unit and supply the second input signal to the control unit. The envelope detector may be connected in parallel to the drain terminal of a switching unit.

In embodiments, a control unit may include at least one of: (1) A peak voltage detector configured to output a peak voltage corresponding to the first input signal supplied through the divider. (2) An operational amplifier configured to generate an output voltage using a value obtained by multiplying the peak voltage of the peak voltage detector and an operational amplification feedback result. (3) A multiplier configured to multiply the output voltage of the operational amplifier and the second input signal supplied through the envelope detector to generate a reference voltage. (4) A critical conduction mode timing generator configured to generate a set signal when the inductor current of the transformer is 0 A. (5) A comparator configured to compare the voltage supplied through the switching current sensing resistor with the reference voltage of the multiplier and output a logic signal according to the compared result. (6) A latch circuit configured to be set or reset in response to the logic signal of the comparator to generate an output signal at high level or low level.

In embodiments, when the voltage supplied through the switching current sensing resistor is higher than the reference voltage, the latch circuit may be reset such that the switching unit is turned off.

In embodiments, an isolated flyback converter for an LED driver may include at least one of: (1) A snubber circuit configured to be connected to the primary side of a transformer, to which a power supply voltage is supplied, which may prevent overvoltage or overcurrent. (2) A switching unit which has a source terminal connected to a switching current sensing resistor and a drain terminal connected to the snubber circuit, which is turned on or off. (3) A control unit.

In embodiments, the control unit is configured to at least one of: (1) Detect a first input signal proportional to a signal obtained by low-pass filtering the power supply voltage chopped such that the switching cycle and a duty of the switching unit are synchronized. (2) Detect a second input signal proportional to a result of low-pass filtering an output signal of the switching unit. (3) Control a peak current of the switching unit to be proportional to the multiplication result of a signal inversely proportional to the maximum value of the first input signal and the second input signal such that a secondary-side current of the transformer is maintained constant.

In embodiments, an isolated flyback converter may include a chopper. The chopper may be configured to attenuate the power supply voltage, supply the first input signal to the control unit, and configured to be controlled in response to the same signal as the control signal of the switching unit. An isolated flyback converter may include a low pass filter which is connected in parallel to the drain terminal of the switching unit to low-pass filter an output voltage of the switching unit and supply the second input signal to the control unit.

The control unit may include at least one of: (1) A peak voltage detector configured to output a peak voltage corresponding to the first input signal supplied through the chopper. (2) An operational amplifier configured to generate an output voltage using a value obtained by multiplying the peak voltage of the peak voltage detector and an operational amplification feedback result. (3) A multiplier configured to multiply the output voltage of the operational amplifier and the second input signal supplied through the low pass filter to generate a reference voltage. (4) A critical conduction mode timing generator configured to generate a set signal when the inductor current of the transformer is 0 A. (5) A comparator configured to compare the voltage supplied through the switching current sensing resistor with the reference voltage of the multiplier and output a logic signal according to the compared result. (6) A latch circuit configured to be set or reset in response to the logic signal of the comparator to generate an output signal at a high level or a low level.

In embodiments, when the voltage supplied through the switching current sensing resistor is higher than the reference voltage, the latch circuit may be reset such that the switching unit is turned off.

In embodiments, an isolated flyback converter for an LED driver may include at least one of: (1) A snubber circuit configured to be connected to the primary side of a transformer, to which a power supply voltage is supplied, which may prevent overvoltage or overcurrent. (2) A switching unit configured to have a source terminal connected to a switching current sensing resistor and a drain terminal connected to the snubber circuit and configured to be turned on or off. (3) A control unit.

In embodiments, a control unit is configured to perform at least one of (1) Detect a first input signal proportional to a signal obtained by low-pass filtering the power supply voltage chopped such that the switching cycle and duty of the switching unit are synchronized. (2) Detect a second input signal proportional to a fluctuation in the power supply voltage. (3) Control a peak current of the switching unit to be proportional to the multiplication result of a signal inversely proportional to the maximum value of the first input signal and the second input signal such that a secondary-side current of the transformer is maintained constant.

In embodiments, an isolated flyback converter may include a chopper. A chopper may be configured to attenuate the power supply voltage, supply the first input signal to the control unit, and configured to be controlled in response to the same signal as the control signal of the switching unit. In embodiments, an isolated flyback converter may include a divider configured to attenuate the power supply voltage and supply the second input signal to the control unit.

In embodiments, a control unit may include at least one of (1) A peak voltage detector configured to output a peak voltage corresponding to the first input signal supplied through the chopper. (2) An operational amplifier configured to generate an output voltage using a value obtained by multiplying the peak voltage of the peak voltage detector and an operational amplification feedback result. (3) A multiplier configured to multiply the output voltage of the operational amplifier and the second input signal supplied through the divider to generate a reference voltage. (4) A critical conduction mode timing generator configured to generate a set signal when the inductor current of the transformer is 0 A. (5) A comparator configured to compare the voltage supplied through the switching current sensing resistor with the reference voltage of the multiplier and output a logic signal according to the compared result. (6) A latch circuit configured to be set or reset in response to the logic signal of the comparator to generate an output signal at a high level or a low level.

In embodiments, when the voltage supplied through the switching current sensing resistor is higher than the reference voltage, the latch circuit may be reset such that the switching unit is turned off.

In embodiments, an isolated flyback converter for an LED driver may include at least one of (1) A snubber circuit configured to be connected to the primary side of a transformer, to which a power supply voltage is supplied, which may prevent overvoltage or overcurrent. (2) A switching unit configured to have a source terminal connected to a switching current sensing resistor and a drain terminal connected to the snubber circuit and configured to be turned on or off. (3) A control unit.

In embodiments, a control unit may be configured to perform at least one of: (1) Detect a first input signal proportional to a signal obtained by low-pass filtering an output voltage of the switching unit. (2) Detect a second input signal proportional to the envelope voltage of the output voltage of the switching unit when the switching unit is turned off and control a peak current of the switching unit to be proportional to the multiplication result of a signal inversely proportional to the maximum value of the first input signal and the second input signal such that a secondary-side current of the transformer is maintained constant.

In embodiments, an isolated flyback converter may include at least one of: (1) A low pass filter configured to be connected in parallel to the drain terminal of the switching unit to low-pass filter an output voltage of the switching unit and supply the first input signal to the control unit. (2) An envelope detector configured to be connected in parallel to the drain terminal of the switching unit to detect the envelope voltage of an output voltage of the switching unit and supply the second input signal to the control unit.

In embodiments, a control unit may include at least one of: (1) A peak voltage detector configured to output a peak voltage corresponding to the first input signal supplied through the low pass filter. (2) An operational amplifier configured to generate an output voltage using a value obtained by multiplying the peak voltage of the peak voltage detector and an operational amplification feedback result. (3) A multiplier configured to multiply the output voltage of the operational amplifier and the second input signal supplied through the envelope detector to generate a reference voltage. (4) A critical conduction mode timing generator configured to generate a set signal when the inductor current of the transformer is 0 A. (5) A comparator configured to compare the voltage supplied through the switching current sensing resistor with the reference voltage of the multiplier and output a logic signal according to the comparison result. (6) A latch circuit configured to be set or reset in response to the logic signal of the comparator to generate an output signal at a high level or a low level.

In embodiments, when the voltage supplied through the switching current sensing resistor is higher than the reference voltage, the latch circuit may be reset such that the switching unit is turned off.

In accordance with embodiments, it may be possible to control the driving of an LED without being affected by fluctuations in an LED load or fluctuations in the magnitude of a power supply voltage with no current sensor or an insulation element (e.g. an opto-coupler) in an isolation-type LED driver circuit. Embodiments may improve a power factor of the LED driver circuit and/or may stably control a secondary-side current through only primary-side control with no additional circuit on the secondary side of the transformer.

BRIEF DESCRIPTION OF THE DRAWINGS

The above and other features of embodiments will become apparent from the following description of embodiments given in conjunction with the accompanying drawings, in which:

FIGS. 9A and 9B are diagrams illustrating the drain waveform and low-pass filtered waveform of a MOSFET, and the chopping waveform and low-pass filtered waveform of a power supply voltage, in accordance with embodiments, respectively.

DESCRIPTION

Advantages and features of embodiments and methods of accomplishing the same may be understood more readily by reference to the following detailed description of embodiments and the accompanying drawings.

Embodiments implement an LED driver and an isolated flyback converter capable of controlling the driving of an LED without being affected by fluctuations in an LED load or fluctuations in the magnitude of power supply voltage with no current sensor or insulation element (e.g. an opto-coupler) in an isolation-type LED driver circuit. Embodiments relate to maximizing a power factor of the LED driver circuit and stably controlling a secondary-side current through only primary-side control in a transformer.

It may be necessary to analyze a relational equation relating to a secondary-side current of a flyback converter based on critical conduction mode (CRM) control. The critical conduction mode control means that the current of an inductor Lm maximizes from 0 A when a switch is turned on during a switching cycle, minimizes after the switch is turned off, and becomes 0 A when the switching cycle ends. This operation is called a critical conduction mode operation because the current of the inductor may operate at the boundary between a continuous conduction mode and a discontinuous conduction mode.

Figure 1:
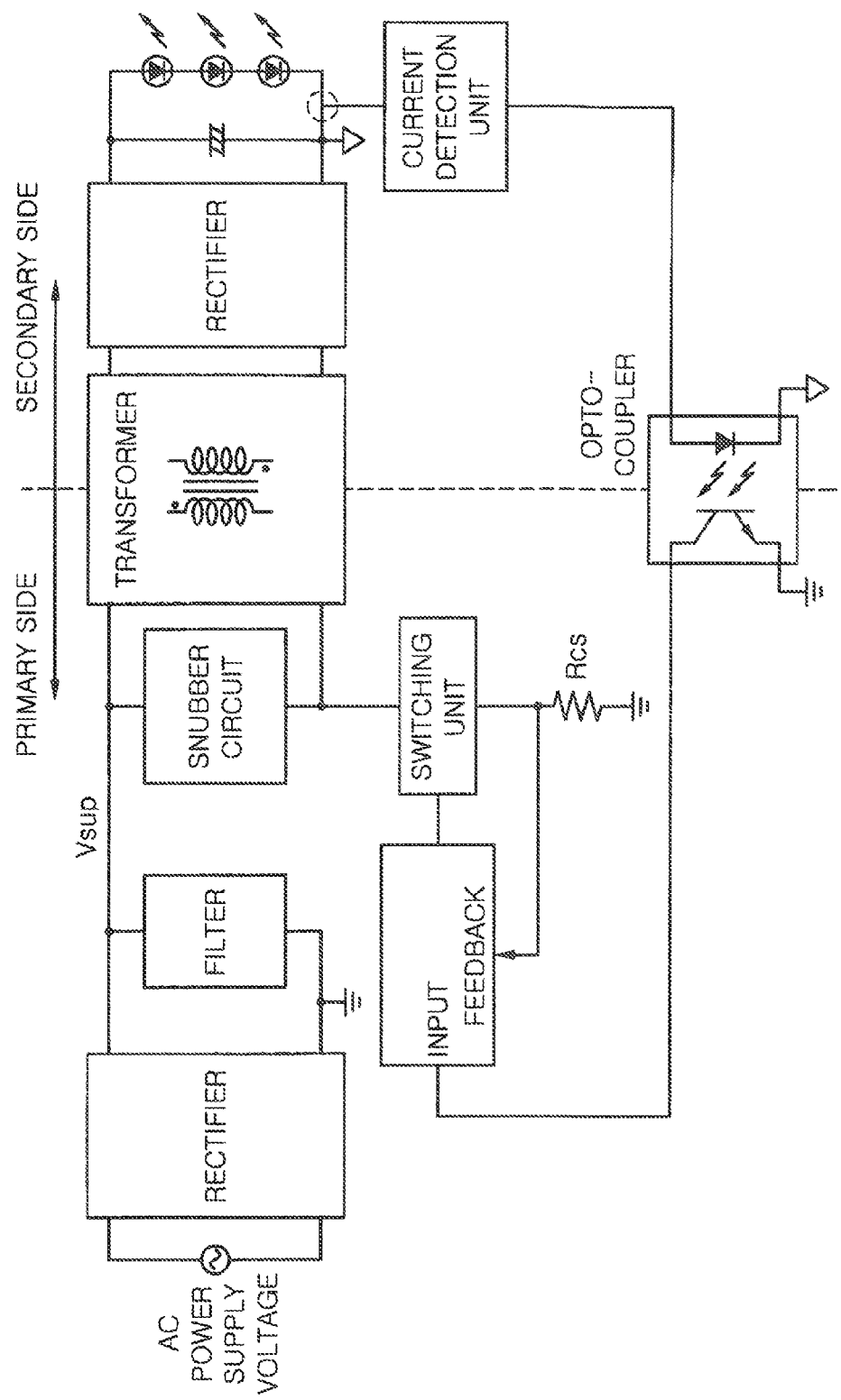
FIG. 1 is a block configuration diagram illustrating an isolation-type LED driver, in accordance with the related art.
Figure 2:
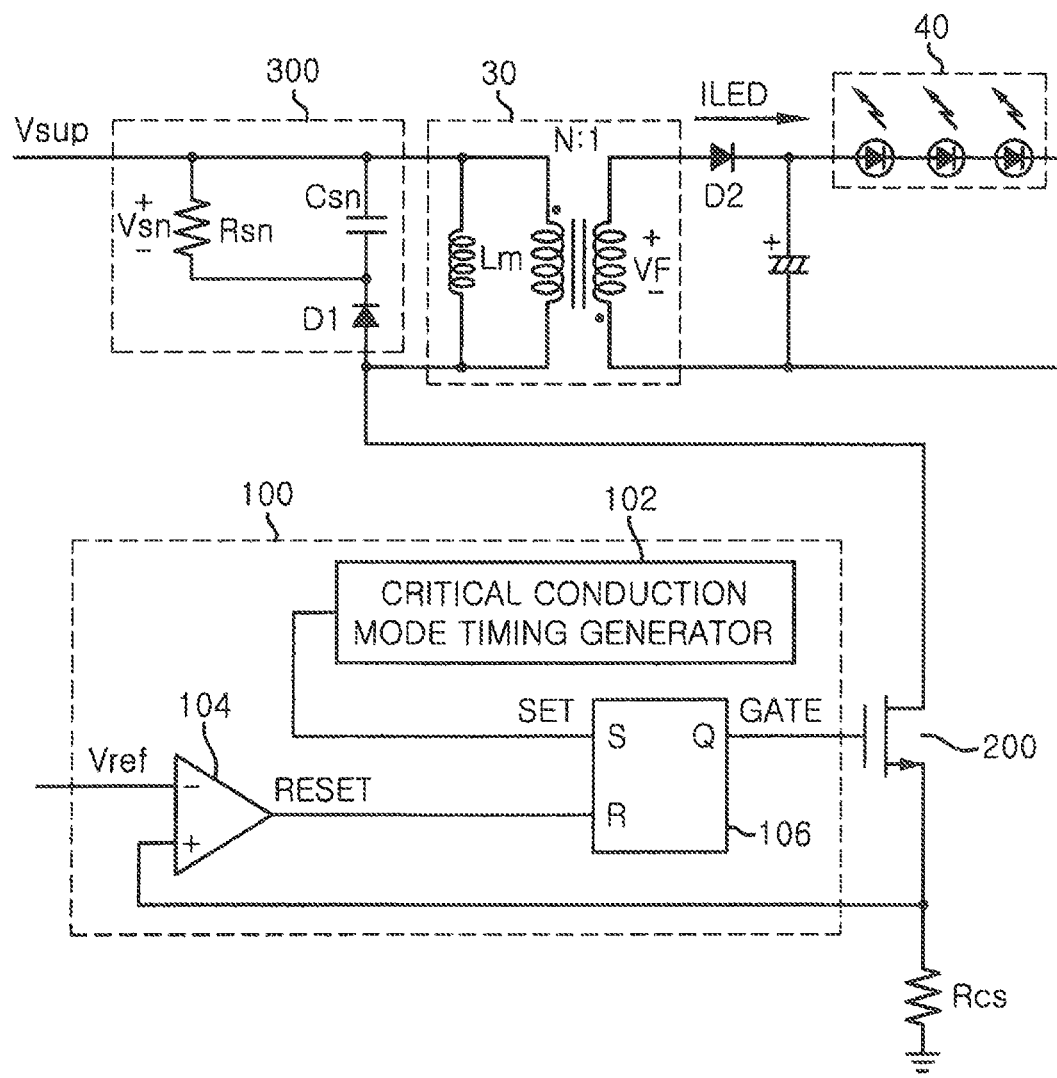
FIG. 2 is a configuration diagram illustrating a critical conduction mode control-type flyback converter, in accordance with embodiments.

FIG. 2 illustrates a critical conduction mode flyback converter, in accordance with embodiments. The critical conduction mode flyback converter includes a control unit 100, a critical conduction mode timing generator 102, a comparator 104, and a latch circuit 106 in the control unit 100, a switching unit 200, a snubber circuit 300, a transformer 30, and an LED load 40.

The critical conduction mode timing generator 102 of the control unit 100 is, for example, a circuit which applies a set signal to the latch circuit 106 when the current of the inductor minimizes to 0 and may set a gate signal of the latch circuit 106 in a relatively high state. The switching unit 200 is constituted by, for e.g., a MOSFET (Metal Oxide Semiconductor Field Effect Transistor) or similar devices, and may be turned on or off when the gate signal of the latch circuit 106 may be in the relatively high or relatively low state. A resistor Rcs which senses a switching current may be connected to the switching unit 200.

The snubber circuit 300 may be a type of protection circuit, and includes, for e.g., an overvoltage prevention circuit or an overcurrent prevention circuit. The snubber circuit 300 may include a snubber resistor Rsn, a snubber capacitor Csn, and a diode D1.

Figure 3:
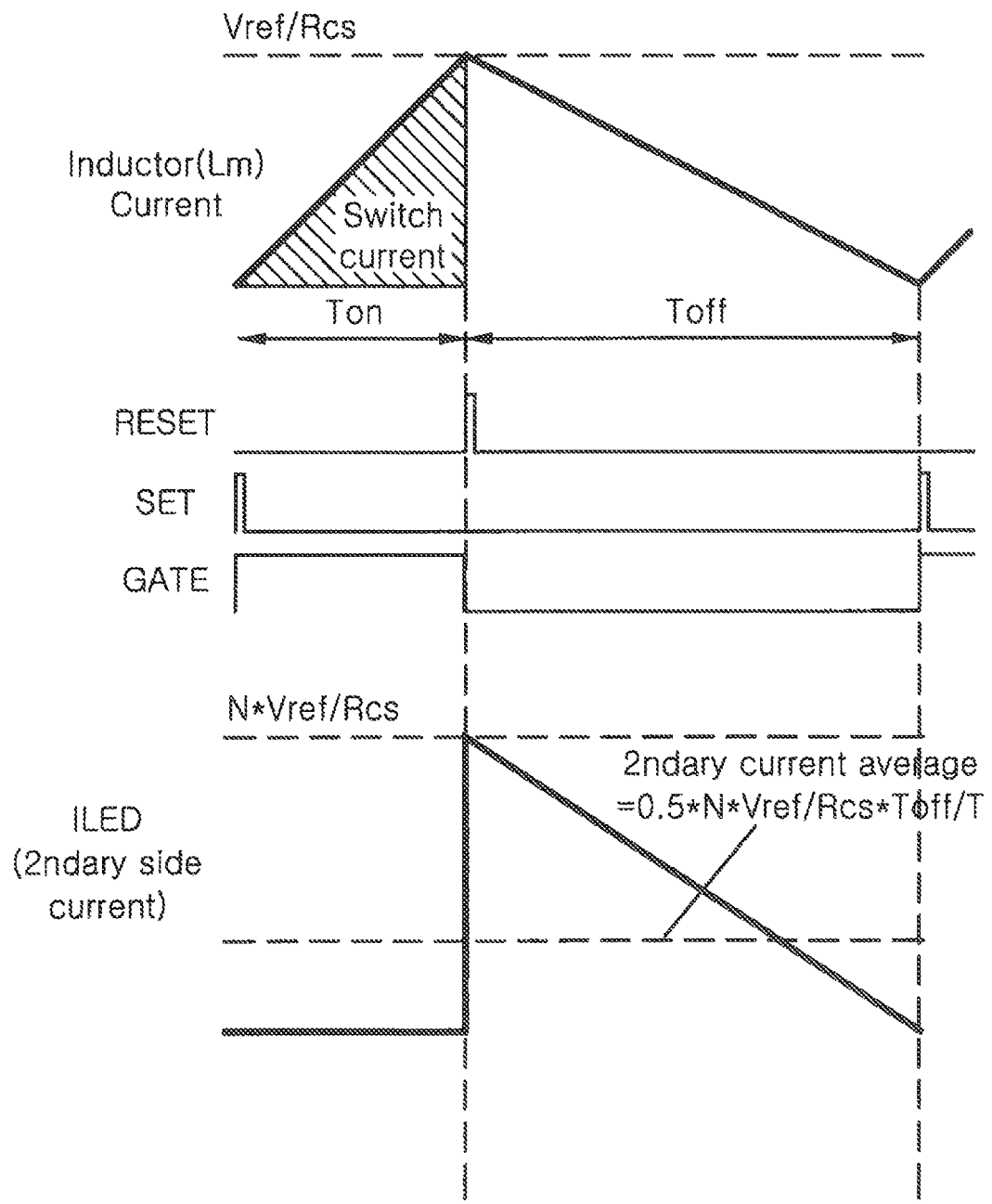
FIG. 3 is a waveform chart illustrating an inductor current and a secondary-side current of a transformer in the flyback converter of FIG. 2, in accordance with embodiments.

FIG. 3 is a waveform chart showing an inductor current and a secondary-side current of a transformer in the flyback converter of FIG. 2, in accordance with embodiments. The operation of the flyback converter will be described with reference to FIG. 3.

First, since the flyback converter of FIG. 2 performs the critical conduction mode operation, it may be assumed that an initial current value of the inductor Lm is 0. At this time, as shown in FIG. 3, for the period Ton of time for which the switching unit 200 may be turned on, the current of the inductor Lm may maximize, and a current value I(t) at this time may be determined by Equation 1.

$$I(t) = \frac{Vsup}{Lm} t \quad \text{[Equation 1]}$$

Since the current during the period Ton of time for which the switching unit 200 may be turned on is equal to the current of the inductor, the current of the inductor may flow in Rcs. If this current is converted to a voltage by Res and this voltage becomes equal to a reference voltage Vref, an output of the comparator 104 may be in the relatively high state to generate a reset signal.

For this reason, an output of the latch circuit 106 is in the relatively low state, and as shown in FIG. 3, the gate signal may be in the relatively low state. Then, the switching unit 200 may be turned off, and the inductor current may not maximize any more.

Accordingly, the time until the maximum value of the inductor current becomes Vref/Res is Ton for which the switching unit 200 may be turned on. Ton is expressed by Equation 2.

$$Ton = \frac{Lm}{Vsup} \cdot \frac{Vref}{Rcs} \quad \text{[Equation 2]}$$

After Ton, the switching unit 200 may be turned off, and the inductor current may be transmitted to the secondary side through the transformer 30. Accordingly, as shown in FIG. 3, the inductor current minimizes to 0. An inductor current minimization rate may be determined by a voltage across both ends of the inductor, as in Equation 1. If the switching unit 200 is turned off, energy of the inductor may be transferred to the secondary side of the transformer 30, and electrical conduction may be provided to a secondary-side rectifying diode, thereby forming a current path, during which, a secondary-side voltage of the transformer 30 becomes VF, a voltage of the LED load 40. When viewed from the primary side of the transformer 30, the secondary-side voltage may become N times by a winding ratio (N:1) between the primary side and the secondary side, and a current minimization slope may be determined by N*VF/Lm.

Accordingly, the time Toff until the inductor current minimizes to 0 is expressed by Equation 3.

$$Toff = \frac{Lm}{N \cdot VF} \cdot \frac{Vref}{Rcs} \quad \text{[Equation 3]}$$

Ton is the time for which the switching unit 200 may be turned on, and Toff is the time for which the switching unit 200 may be turned off. Accordingly, the total time of Ton and Toff may become the switching cycle T of the switching unit 200.

As shown in FIG. 3, the secondary-side current may be N times greater than the primary-side inductor current for the period Toff of time. Accordingly, an average LED current in one cycle may be predicted as in Equation 4.

$$ILED = 0.5 \times N \cdot \frac{Vref}{Rcs} \cdot \frac{Toff}{Ton + Toff} \quad \text{[Equation 4]}$$

If the results of Equations 2 and 3 are substituted in Equation 4, the average LED current in one cycle may be expressed by Equation 5.

$$ILED = 0.5 \times N \cdot \frac{Vref}{Rcs} \cdot \frac{Vsup}{Vsup + N \cdot VF} \quad \text{[Equation 5]}$$

If Equation 4 is modified, Equation 4 may be expressed by the duty which may be the ratio of the on-time and switching cycle of the switching unit 200, and if modified to an equation for a duty D, Equation 6 may be obtained.

$$ILED = 0.5 \times N \cdot \frac{Vref}{Rcs} \cdot (1 - D) \quad \text{[Equation 6]}$$

As might be apparent from Equation 5, since an average current ILED of the LED load in one cycle may differ depending on input voltage Vsup and voltage VF of the LED load, the average current ILED may depend on a line and a load. For this reason, line and load regulation characteristics may be degraded.

Accordingly, embodiments implement an isolated flyback converter for an isolation-type PSR (Primary-Side Regulation) LED driver which can satisfy the line and load regulation characteristics and may compensate for a power factor using the drain voltage of a switching element on the primary side of the transformer 30, for e.g., a MOSFET represented by reference numeral 200 and power supply voltage information.

Hereinafter, for clear understanding of the embodiments, the operation characteristic of the flyback converter will be described in detail with reference to a circuit diagram of FIG. 4 and waveform charts of FIGS. 5A and 5B, in accordance with embodiments.

Figure 4:
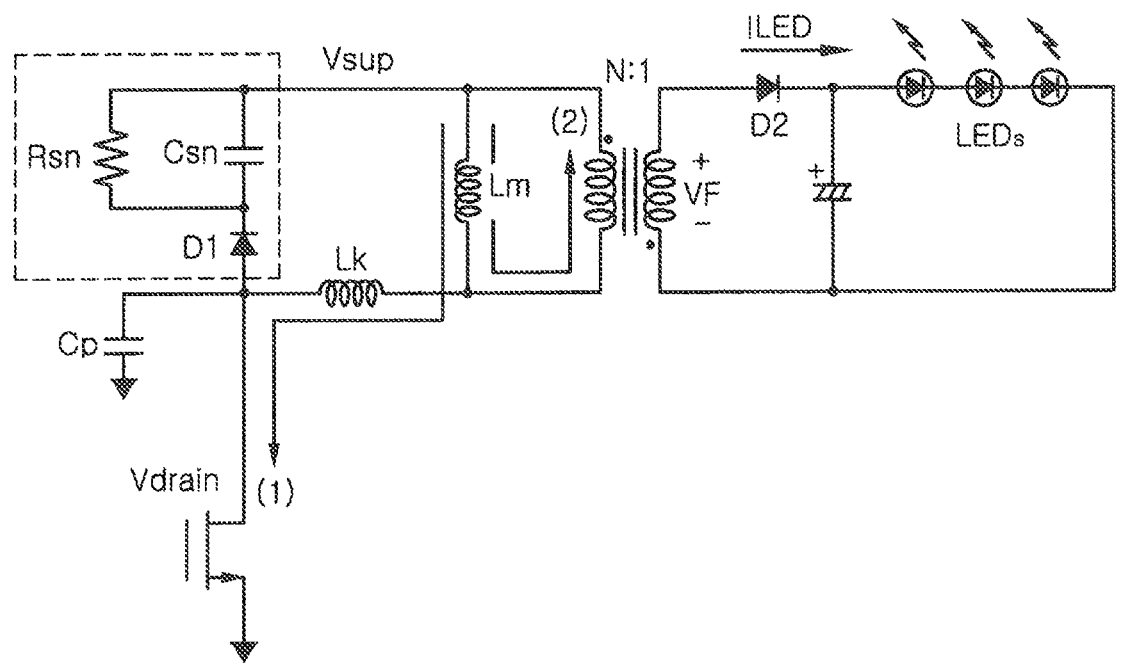
FIG. 4 is a diagram illustrating the operation characteristic of a flyback converter, in accordance with embodiments.
Figure 5A:
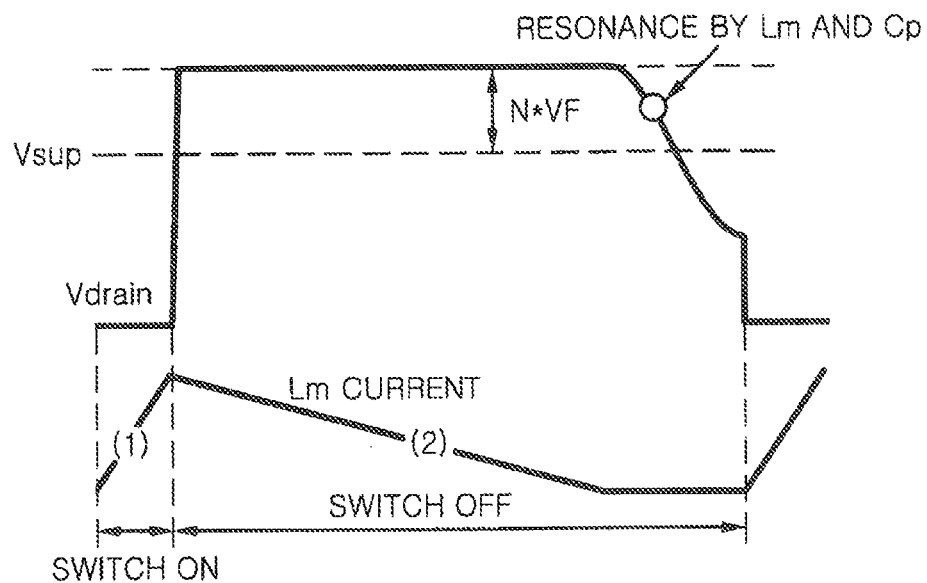
FIGS. 5A and 5B are diagrams illustrating the resonance waveform of the flyback converter of FIG. 4, in accordance with embodiments.
Figure 5B:
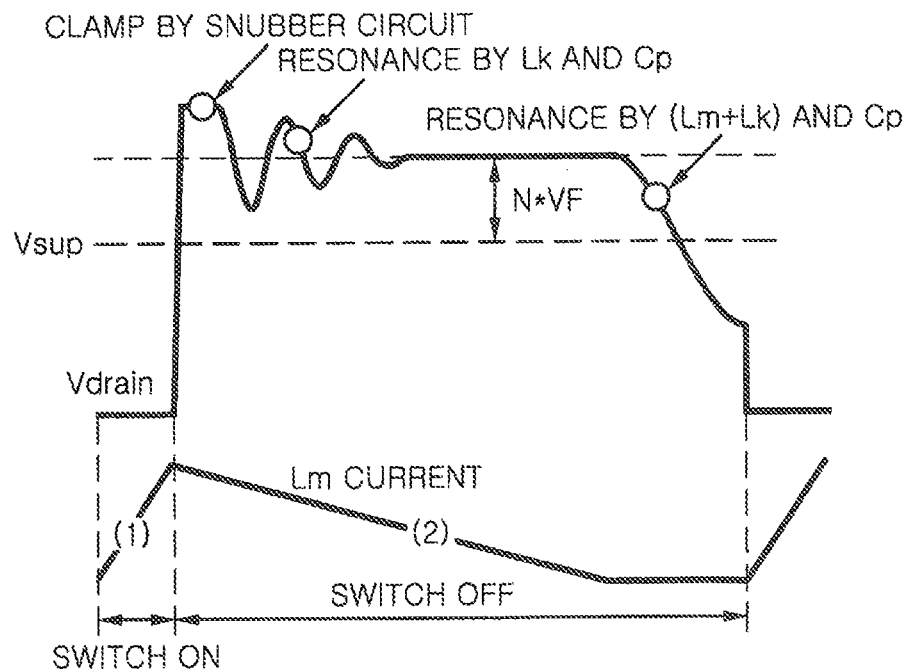

FIG. 4 is a diagram illustrating the operation of the flyback converter excluding the control unit 100 in FIG. 2, in accordance with embodiments. In general, a transformer equivalently includes three elements, for e.g., a transformer, a magnetizing inductance, and a leakage inductance. In FIG. 4, a magnetizing inductance Lm may be an inductance which may be generated during winding, and a leakage inductance Lk may be a parasitic inductance which is undesirably generated in manufacturing a transformer and may have a value significantly smaller than the magnetizing inductance Lm. If there is no leakage inductance Lk of the transformer, a switch drain voltage Vdrain shown in FIG. 5A may be measured.

If the switch is turned on, the drain voltage Vdrain minimizes to a ground potential, and the current of the magnetizing inductance Lm maximizes through a current path (1) of FIG. 4. Subsequently, if the switch is off, the inductor current may be transferred along a current path (2) of FIG. 4 to the transformer to supply energy to the secondary side.

If the inductor current is transferred to the secondary side, resonance by a parasitic capacitor Cp on the drain of the switch drain and the magnetizing inductance Lm may occur. Subsequently, the switch may be turned on again, and the above-described process may be repeated. Since the secondary-side voltage is transferred to the primary side, during a period in which the switch may be turned off, a voltage corresponding to N*VF is applied across both ends of the primary-side inductor, such that the drain voltage becomes Vsup+N*VF. Accordingly, during a period in which the switch may be turned off, VF information relating to the secondary-side LED voltage may be obtained on the drain of the MOSFET switch.

However, actually, a current flowing in the leakage inductance Lk may be charged in a snubber capacitor Csn when the switch may be turned off. Thus, as shown in FIG. 5B, a voltage relatively higher than Vsup+N*VF is generated on the drain, and a resonance waveform by the leakage inductance Lk and the parasitic capacitor Cp may appear, in accordance with embodiments.

Figure 6:
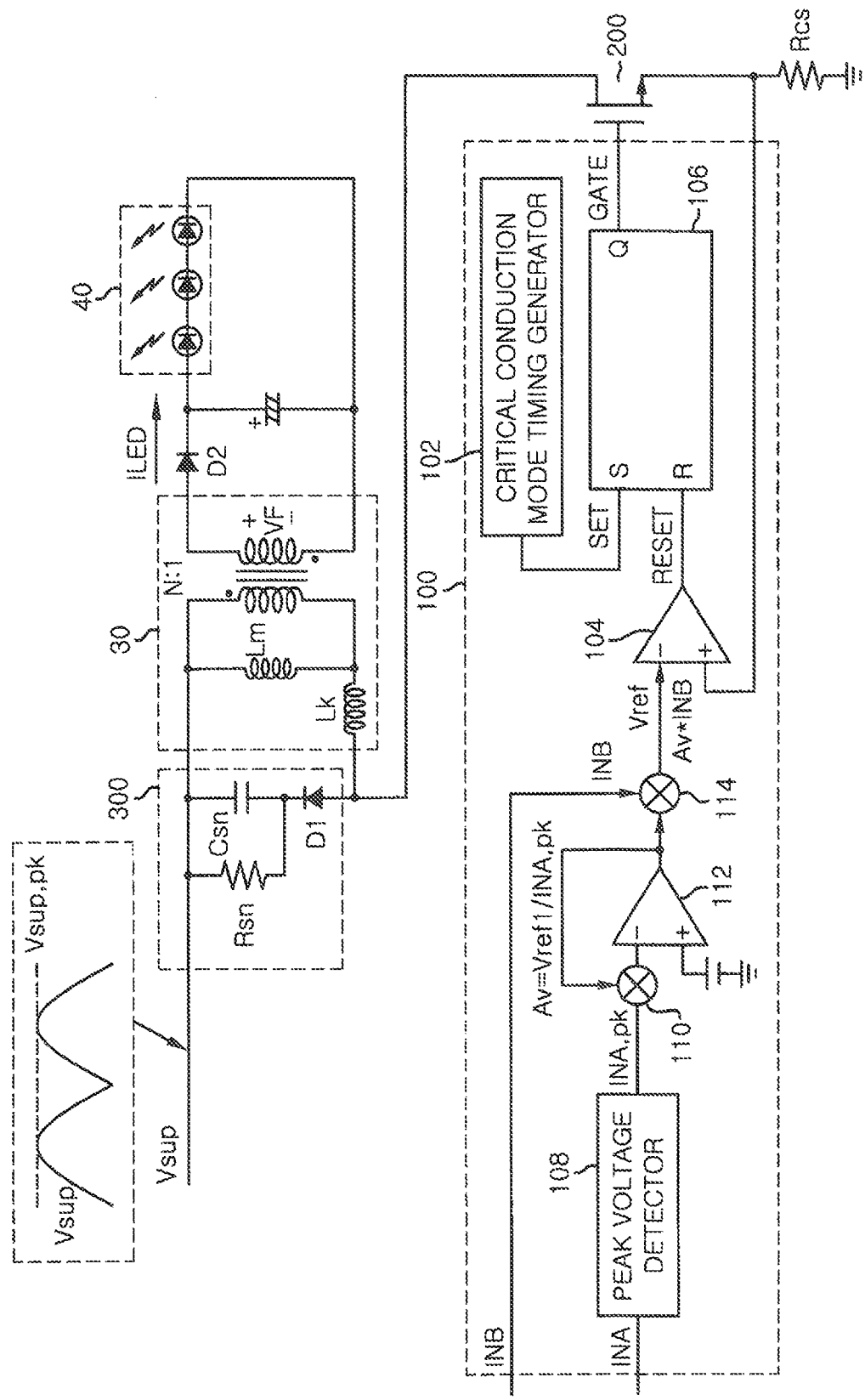
FIG. 6 is a configuration diagram of an isolated flyback converter for an LED driver, in accordance with embodiments.

FIG. 6 is a configuration diagram showing an isolated flyback converter for a PSR (Primary-Side Regulation) LED drive, in accordance with embodiments. The isolated flyback converter may include a control unit 100, a switching unit 200, a snubber circuit 300, a transformer 30, and an LED load 40.

In embodiments, as shown in FIG. 6, the control unit 100 may include a critical conduction mode timing generator 102, a comparator 104, a latch circuit 106, a peak voltage detector 108, first multiplier 110, an operational amplifier 112, and a second multiplier 114.

The critical conduction mode timing generator 102 is, for example, a circuit which may apply a set signal to the latch circuit 106 when the current of the inductor minimizes to 0 and sets the gate signal of the latch circuit 106 in the relatively high state. The configuration of the critical conduction mode timing generator 102 is well known and in a general form, and detailed description thereof will not be provided.

The comparator 104 may compare a voltage supplied through a switching current sensing resistor Rcs and the reference voltage Vref described below, and may output a logic signal according to the comparison result.

The latch circuit 106 may be reset in response to an output signal of the comparator 104, for example, a relatively high signal and in the output state at relatively low level, and is set in response to an output signal of the critical conduction mode timing generator 102 and in the output state at relatively high level to apply the gate input signal at relatively high level or relatively low level to the switching unit 200.

The switching unit 200 is constituted by, for example, a MOSFET or similar device. The switching unit 200 may have a gate terminal connected to the latch circuit 106 and may be turned on or off as a gate input signal of the latch circuit 106 may be in relatively the high or relatively low state. The switching unit 200 may have a source terminal connected to the resistor Rcs which may sense a switching current and a drain connected to the snubber circuit 300.

The control unit 100 may receive two input signals (for example, INA and INB). The peak voltage detector 108 of the control unit 100 may receive INA as a first input signal from the input signal, may detect a peak voltage INA, pk of the first input signal INA, and may supply the detected peak voltage INA,pk to the first multiplier 110.

The first multiplier 110 may multiply the peak voltage INA,pk supplied from the peak voltage detector 108 and an output voltage Av fed back and supplied from the operational amplifier 112 described below. The operational amplifier 112 may supply the output voltage Av in correspondence to the output of the first multiplier 110.

The second multiplier 114 may multiply the output voltage Av supplied from the operational amplifier 112 and INB as a second input signal from the above-described input signals to generate a reference voltage Vref. The generated reference voltage Vref may be applied to the comparator 104. The comparator 104 may compare the reference voltage Vref with a voltage of a switching current sensing resistor Rcs, and may output a logic signal according to the comparison result.

The snubber circuit 300 is a type of protection circuit, and may include, for example, an overvoltage prevention circuit or an overcurrent prevention circuit. The snubber circuit 300 may include a snubber resistor Rsn, a snubber capacitor Csn, and a diode D1, and may be connected to the drain terminal of the switching unit 200.

In reference to the above-described configuration, the operation of the isolated flyback converter of FIG. 6 will be described, in accordance with embodiments. First, the control unit 100 may receives two input signals INA and INB to generate the reference voltage Vref. The comparator 104 may compare a MOSFET current measured in the switching current sensing resistor Rcs with the reference voltage Vref, and if the voltage of the switching current sensing resistor Rcs is relatively higher than the reference voltage Vref, may apply an input to a reset terminal R of the latch circuit 106 to turn off the switching unit 200.

Accordingly, a peak current Ipk of the switching unit 200 may be determined by Equation 7.

$$Ipk = \frac{Vref}{Rcs} \qquad \text{[Equation 7]}$$

The peak voltage detector 108 may detect the peak voltage INA, pk of the first input signal INA. This signal may be used in the first multiplier 110 and the operational amplifier 112, and the output voltage Av may be generated. The output voltage Av of the above-described circuit in a negative feedback arrangement may be expressed by Equation 8.

$$INA,pk \times Av = Vref1$$

Accordingly, the output voltage Av may be expressed by Equation 9.

$$Av = \frac{Vref1}{INA, pk} \quad \text{[Equation 9]}$$

The output voltage Av may be multiplied to another input signal, that is, the second input signal INB, and the reference voltage Vref may be obtained. The reference voltage Vref may be expressed by Equation 10.

$$Vref = Vref1 \cdot \frac{INB}{INA, pk} \quad \text{[Equation 10]}$$

If the result of Equation 10 is substituted in Equations 5 and 6 described above, an average LED current in one cycle may be obtained by Equations 11 and 12.

$$ILED = 0.5 \times N \cdot \frac{Vref1}{Rcs} \cdot \frac{INB}{INA, pk} \cdot \frac{Vsup}{Vsup + N \cdot VF} \quad \text{[Equation 11]}$$

$$ILED = 0.5 \times N \cdot \frac{Vref1}{Rcs} \cdot \frac{INB}{INA, pk} \cdot (1 - D) \quad \text{[Equation 12]}$$

If the input signal INB and the peak voltage INA,pk of the input signal INA are set in Equations 11 and 12, a circuit operation in which an LED current may be controlled regardless of fluctuations in power or load or fluctuations in duty is satisfied.

Hereinafter, four methods which control an LED current in accordance with the input forms of the input signals INA and INB of FIG. 6 will be described, in accordance with embodiments. First, two methods in which a power supply voltage detection circuit is used will be described.

Figure 7:
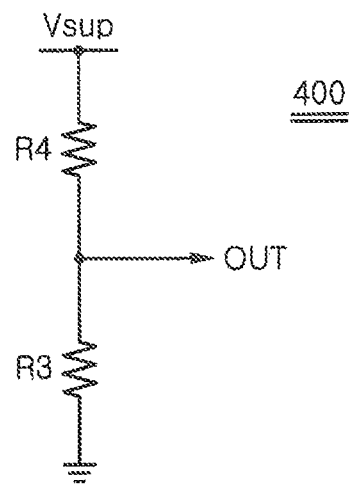
FIG. 7 is a diagram illustrating a power supply voltage detection circuit (e.g. a divider) which may constitute an isolated flyback converter for an LED driver, in accordance with embodiments.

FIG. 7 shows a divider 400 which is a simple attenuation circuit having resistors R3 and R4, in accordance with embodiments. An output OUT of the divider 400 is expressed by Equation 13.

$$OUT = \frac{R3}{R3 + R4} \cdot Vsup = K2 \cdot Vsup \quad \text{[Equation 13]}$$

At this time, K2=R3/(R3+R4).

Figure 8:
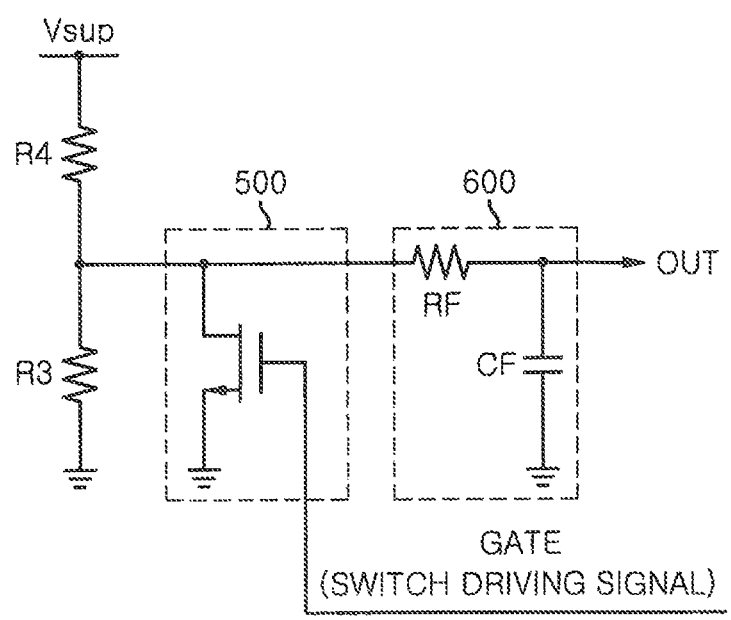
FIG. 8 is a diagram illustrating a power supply voltage detection circuit (e.g. a chopper) which may constitute an isolated flyback converter for an LED driver, in accordance with embodiments.

In a circuit of FIG. 8, as shown in FIG. 7, attenuation is performed using the resistors R3 and R4. Meanwhile, the circuit of FIG. 8 further includes a chopper 500 whose switching is controlled in response to the same signal as a control signal of an output transistor, and a low pass filter (LPF) 600 which has a resistor RF and a capacitor CF, and low-pass filters a signal which is subjected to switching control in the chopper 500. When the chopper 500 of FIG. 8 is turned on, the voltage of the resistor R3 of the divider 400 becomes 0.

Figure 9B:
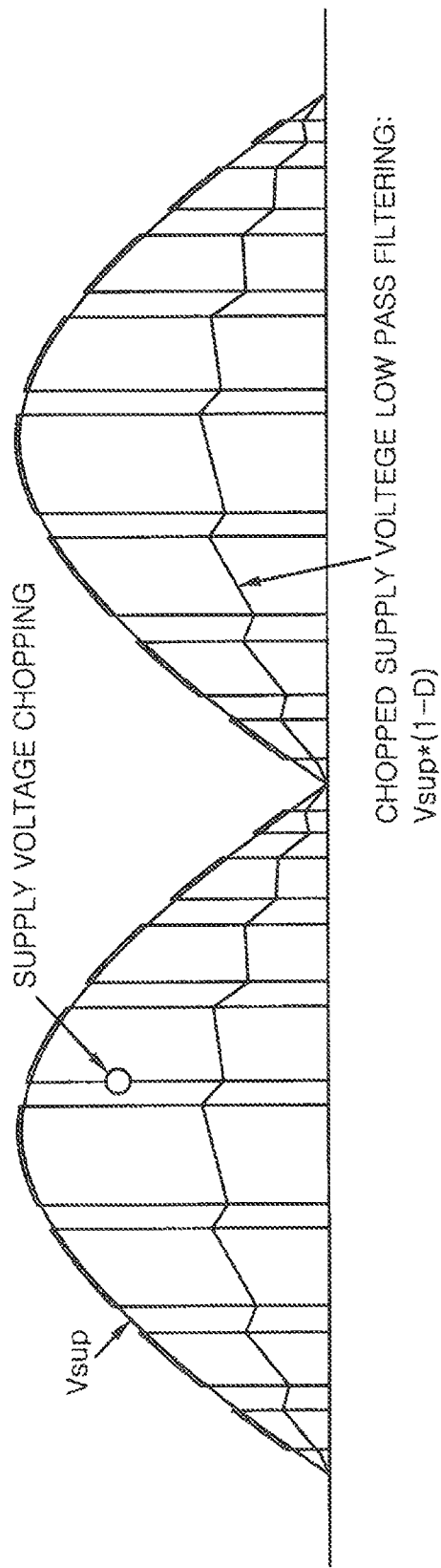

Accordingly, as shown in FIGS. 9A and 9B, a power supply voltage Vsup chopped through the chopper 500 swings between the power supply voltage Vsup and the ground in synchronization with the operation frequency and duty of the output transistor. This voltage is low-pass filtered through the low pass filter 600 having the resistor RF and the capacitor CF, such that an average voltage with no high frequency component is obtained.

At this time, when the operation duty of the output switch is D, the final output low pass filter 600 satisfies Equation 14.

$$OUT = \frac{R3}{R3 + R4} \cdot Vsup \cdot (1 - D) = K2 \cdot Vsup \cdot (1 - D) \quad \text{[Equation 14]}$$

Next, two methods in which an output detection circuit is used will be described.

Figure 10:
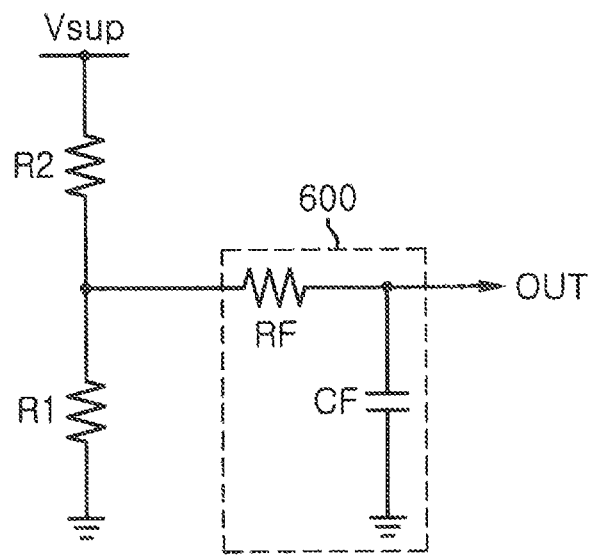
FIG. 10 is a diagram illustrating an output detection circuit (e.g. a divider and a low pass filter (LPF)) which may constitute an isolated flyback converter for an LED driver, in accordance with embodiments.

FIG. 10 shows a configuration in which a divider having resistors R1 and R2 is connected to a low pass filter 600, in accordance with embodiments. In this case, the drain voltage of the switching unit 200 is attenuated by the resistors R1 and R2, and then low-pass filtered through the low pass filter 600, thereby obtaining an output signal.

In FIG. 9A, the drain voltage swings from Vsup+N*VF to 0, and when the switch is turned off, a resonance waveform appears due to parasitic inductance. This signal is low-pass filtered to obtain an average switch output voltage. At this time, since the duty of one cycle is D, the average of the switch output voltage in one cycle is expressed by Equation 15.

$$OUT = \frac{R1}{R1 + R2} Vdrain = K1 \cdot Vdrain \quad \text{[Equation 15]}$$
$$= K1 \cdot (Vsup + N \cdot VF) \cdot (1 - D)$$

In FIG. 9B, the resonance waveform which appears when the switching unit 200 is turned off in FIG. 9A is removed through the low pass filter 600. Accordingly, the resonance waveform is not included in Equation 15.

Figure 11:
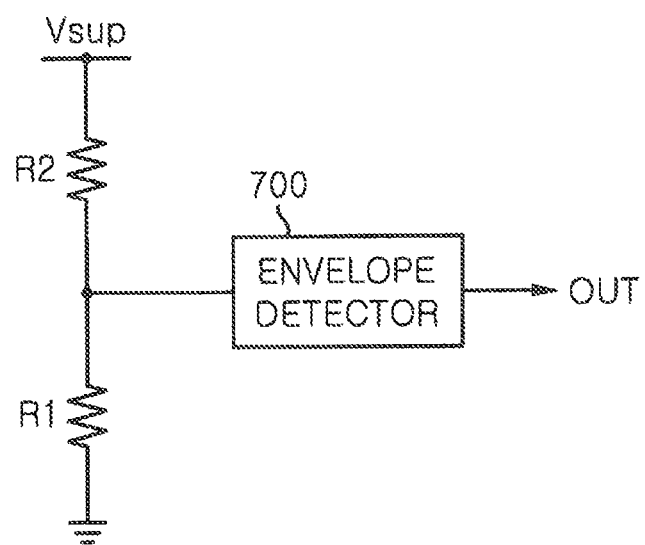
FIG. 11 is a diagram illustrating an output detection circuit (e.g. a divider and an envelope detector) which may constitute an isolated flyback converter for an LED driver, in accordance with embodiments.

FIG. 11 shows a configuration in which an envelope detector 700 is connected to a divider having resistors R1 and R2, in accordance with embodiments. This configuration has a function of detecting a switch output waveform when high-frequency peak noise of the switch output voltage is removed as shown in FIG. 9B.

The envelope detector 700 of FIG. 11 may be implemented in various forms, and embodiments are not limited to a specific circuit. In FIG. 9A, since the envelope of the drain voltage is Vsup+N*VF, the output of the circuit in FIG. 11 is expressed by Equation 16.

$$OUT = K1 \cdot (Vsup + N \cdot VF) \quad \text{[Equation 16]}$$

Hereinafter, an isolated flyback converter for an LED driver according to embodiments in which two power supply voltage detection circuits and two output detection circuits are used will be specifically described.

Prior to describing embodiments, the power supply voltage Vsup is a signal obtained by full-wave rectifying AC power in a sine wave form having a maximum value of Vsup,pk, and expressed by Equation 17.

$$Vsup = Vsup,pk \times |\sin \phi| \quad \text{[Equation 17]}$$

Figure 12:
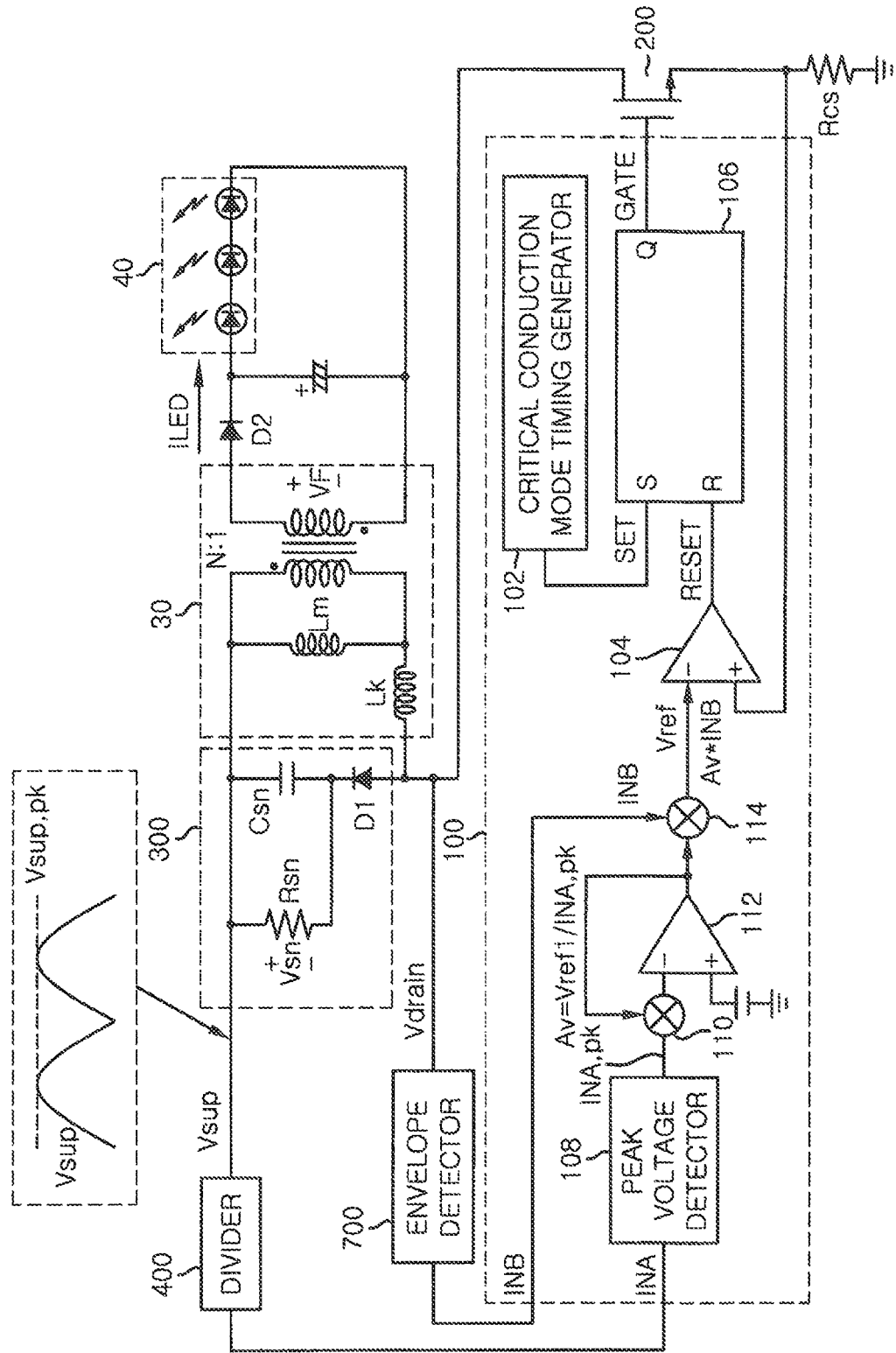
FIG. 12 is a diagram illustrating an isolated flyback converter for an LED driver, in accordance with embodiments.

FIG. 12 shows an isolated flyback converter for an LED driver, according to embodiments. The isolated flyback converter includes a control unit 100, a switching unit 200, a snubber circuit 300, a divider 400, an envelope detector 700, a transformer 30, and an LED load 40. FIG. 12 shows a case where a power supply voltage is applied using the divider 400 as an attenuator for the first input signal INA, and the envelope detector 700 to which the drain voltage of the switching unit 200 is supplied is used for the second input signal INB.

Let the attenuation gain of the divider 400 be K2, and the attenuation gain of the envelope detector 700 be K1.

In this case, the peak of the first input signal INA is K2*Vsup,pk, and the second input signal INB satisfies Equation 16. Accordingly, the average LED current in one cycle is expressed by Equation 18 on the basis of Equation 11.

$$I_{LED} = 0.5 \times N \cdot \frac{Vref1}{Rcs} \cdot \frac{INB}{INA, pk} \cdot \frac{Vsup}{Vsup + N \cdot VF} \quad \text{[Equation 18]}$$

$$= 0.5 \times N \cdot \frac{Vref1}{Rcs} \cdot \frac{K1(Vsup + N \cdot VF)}{K2 \cdot Vsup, pk} \cdot \frac{Vsup}{Vsup + N \cdot VF}$$

$$= 0.5 \times N \cdot \frac{Vref1}{Rcs} \cdot \frac{K1}{K2} \cdot |\sin\phi|$$

Figure 13:
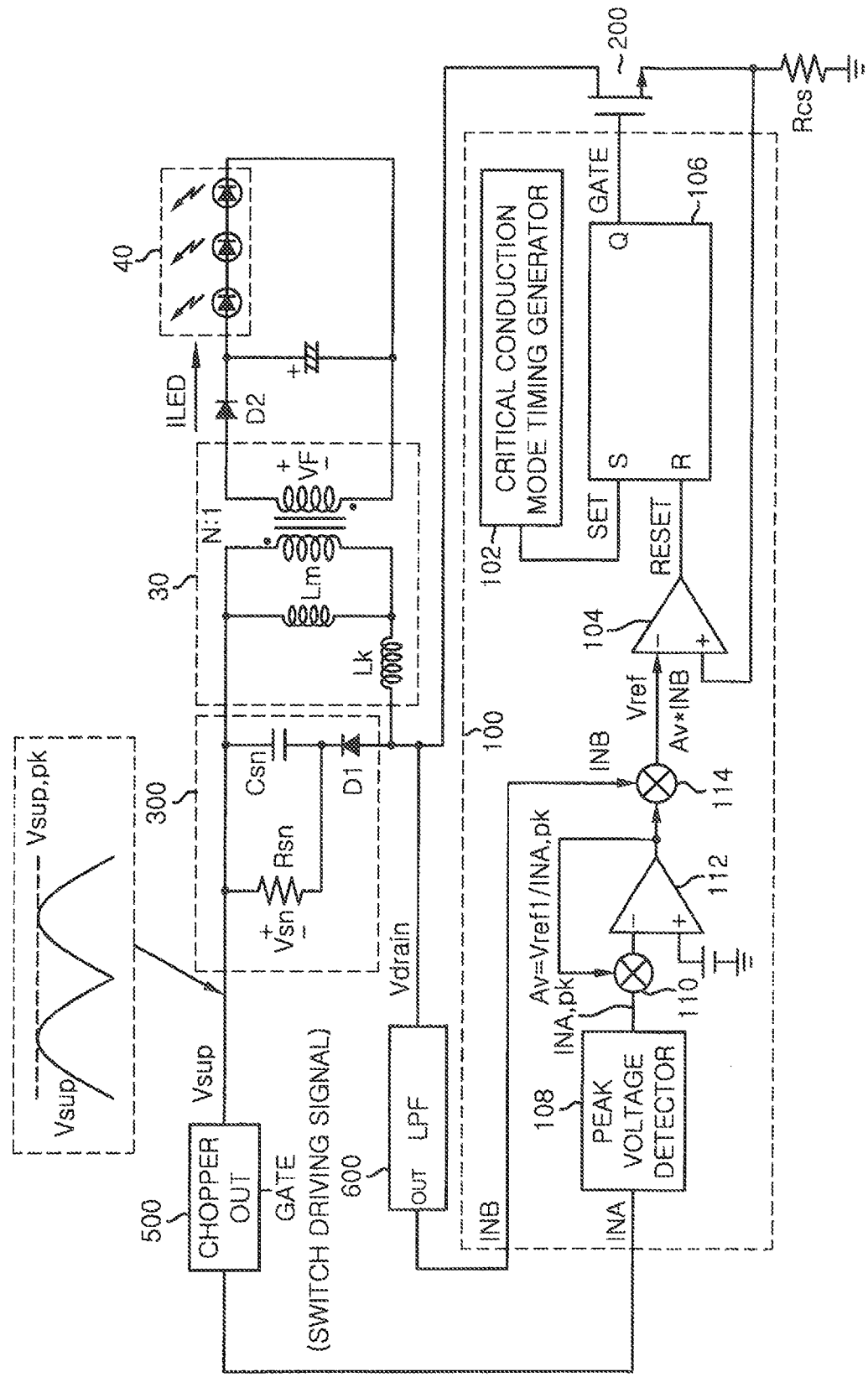
FIG. 13 is a diagram illustrating an isolated flyback converter for an LED driver, in accordance with embodiments.

FIG. 13 shows an isolated flyback converter for an LED driver according to embodiments. The isolated flyback converter includes a control unit 100, a switching unit 200, a snubber circuit 300, a chopper 500, a low pass filter 600, a transformer 30, and an LED load 40. FIG. 13 shows a case where the power supply voltage Vsup is input using the chopper 500 for the first input signal INA, and the drain voltage of the switching unit 200 is low-pass filtered and input using the low pass filter 600 for the second input signal INB.

At this time, let the attenuation gain of the chopper 500 be K2, and the attenuation gain of the low pass filter 600 be K1. In this case, the first input signal INA becomes K2*Vsup*(1−D) in Equation 14, and the second input signal INB satisfies Equation 15.

Since the peak value INA,pk of the first input signal INA becomes K2*Vsup,pk*(1−D), the average LED current in one cycle is expressed by Equation 19 on the basis of Equation 11.

$$I_{LED} = 0.5 \times N \cdot \frac{Vref1}{Rcs} \cdot \frac{INB}{INA, pk} \cdot \frac{Vsup}{Vsup + N \cdot VF} \quad \text{[Equation 19]}$$

$$= 0.5 \times N \cdot \frac{Vref1}{Rcs} \cdot \frac{K1(Vsup + N \cdot VF) \cdot (1-D)}{K2 \cdot Vsup, pk \cdot (1-D)} \cdot \frac{Vsup}{Vsup + N \cdot VF}$$

$$= 0.5 \times N \cdot \frac{Vref1}{Rcs} \cdot \frac{K1}{K2} \cdot |\sin\phi|$$

Figure 14:
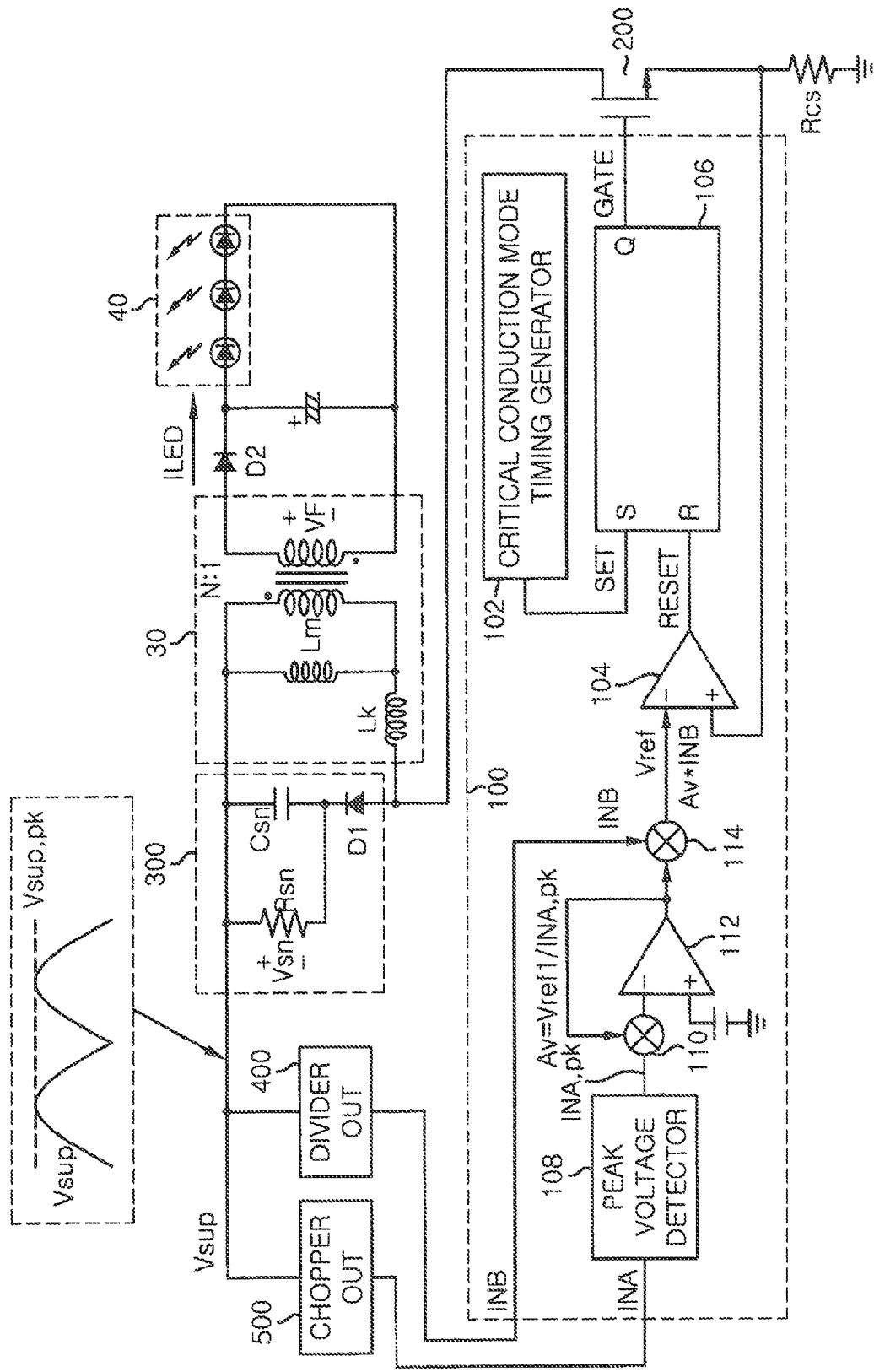
FIG. 14 is a diagram illustrating an isolated flyback converter for an LED driver, in accordance with embodiments.

FIG. 14 shows an isolated flyback converter for an LED driver, according to embodiments. The isolated flyback converter includes a control unit 100, a switching unit 200, a snubber circuit 300, a divider 400, a chopper 500, a transformer 30, and an LED load 40. FIG. 14 shows a case where the chopper 500 and the divider 400 are respectively used for the first and second input signals INA and TNB, and both use the power supply voltage Vsup as input.

At this time, let the attenuation gain of the chopper 500 be K2, and the attenuation gain of the divider 400 be K1. When the attenuation gains are set, the first input signal INA becomes K2*Vsup*(1−D), and the second input signal INB becomes K2*Vsup. Accordingly, the peak value of the first input signal INA becomes K2*Vsup,pk*(1−D).

With the above-described settings, the average LED current in one cycle is expressed by Equation 20 on the basis of Equation 12.

$$I_{LED} = 0.5 \times N \cdot \frac{Vref1}{Rcs} \cdot \frac{INB}{INA, pk} \cdot (1-D) \quad \text{[Equation 20]}$$

$$= 0.5 \times N \cdot \frac{Vref1}{Rcs} \cdot \frac{K1 \cdot Vsup}{K2 \cdot Vsup, pk \cdot (1-D)} \cdot (1-D)$$

$$= 0.5 \times N \cdot \frac{Vref1}{Rcs} \cdot \frac{K1}{K2} \cdot |\sin\phi|$$

Figure 15:
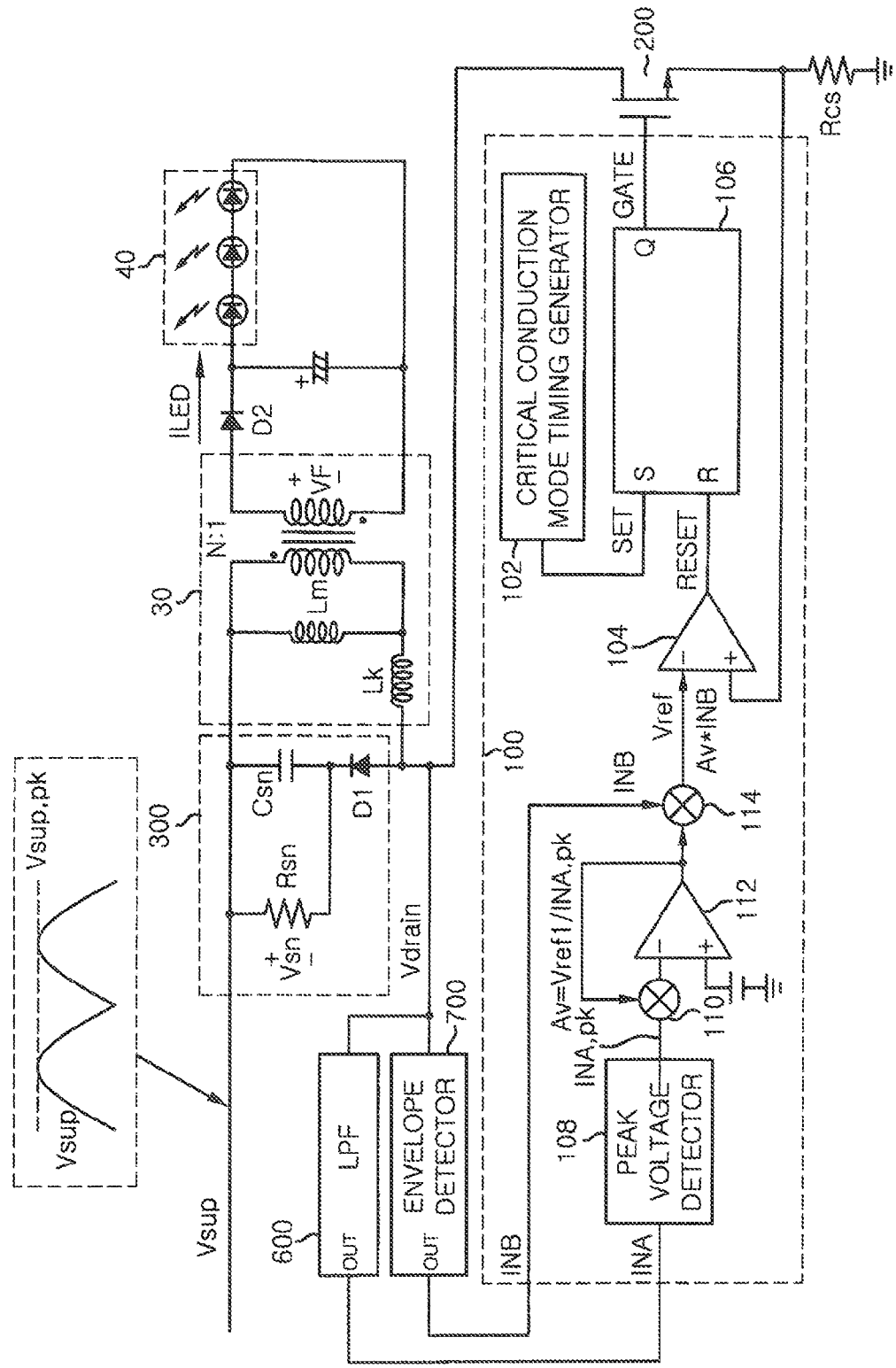
FIG. 15 is a diagram illustrating an isolated flyback converter for an LED driver, in accordance with embodiments.

FIG. 15 shows an isolated flyback converter for an LED driver, in accordance with embodiments. The isolated flyback converter includes a control unit 100, a switching unit 200, a snubber circuit 300, a low pass filter 600, an envelope detector 700, a transformer 30, and an LED load 40. FIG. 15 shows a case where the low pass filter 600 and the envelope detector 700 are used and both use the drain voltage Vdrain. At this time, let the attenuation gain of the low pass filter 600 be K2, and the attenuation gain of the envelope detector 700 be K1. With the above-described settings of the attenuation gains, the first and second input signals INA and INB are expressed by Equation 21.

$$INA = K2*(Vsup+N*VF)*(1-D)$$

$$INB = K1*(Vsup+N*VF) \quad \text{[Equation 21]}$$

Here, if the peak value of Vsup+N*VF is (Vsup+N*VF)pk, the peak value of the first input signal INA is expressed by Equation 22.

$$K2*(Vsup+N*VF)pk*(1-D) \quad \text{[Equation 22]}$$

While the maximum value of the second input signal INB becomes K1*(Vsup+N*VF)pk, the second input signal INB fluctuates with a fluctuation in the power supply voltage Vsup. Accordingly, when the degree of fluctuation is a constant α, the second input signal INB is expressed by Equation 23.

$$INB = K1 \cdot (Vsup+N \cdot VF)pk \cdot \alpha \quad \text{[Equation 23]}$$

With the use of Equation 23, the average LED current in one cycle is expressed by Equation 24 on the basis of Equation 12.

$$I_{LED} = 0.5 \times N \cdot \frac{Vref1}{Rcs} \cdot \frac{INB}{INA, pk} \cdot (1-D) \quad \text{[Equation 24]}$$

$$= 0.5 \times N \cdot \frac{Vref1}{Rcs} \cdot \frac{K1 \cdot (Vsup + N \cdot VF) \cdot pk \cdot \alpha}{K2 \cdot (Vsup + N \cdot VF)pk \cdot (1-D)} \cdot (1-D)$$

$$= 0.5 \times N \cdot \frac{Vref1}{Rcs} \cdot \frac{K1}{K2} \cdot \alpha$$

As will be apparent from the first to fourth embodiments, in all cases, the LED current is constant as maximum 0.5*N*(Vref1/Rcs)*(K1/K2), and it can be understood that a current is controlled regardless of a fluctuation in power or load.

In embodiments that include equations with the sine term, a change is made in accordance with the form of input power, the input voltage and the LED current undergo the same phase change, thereby decreasing reactive power and increasing the power factor. In embodiments that include equations with no sine term, but the constant α changes sinusoidally, the power factor may be improved.

Figure 16:
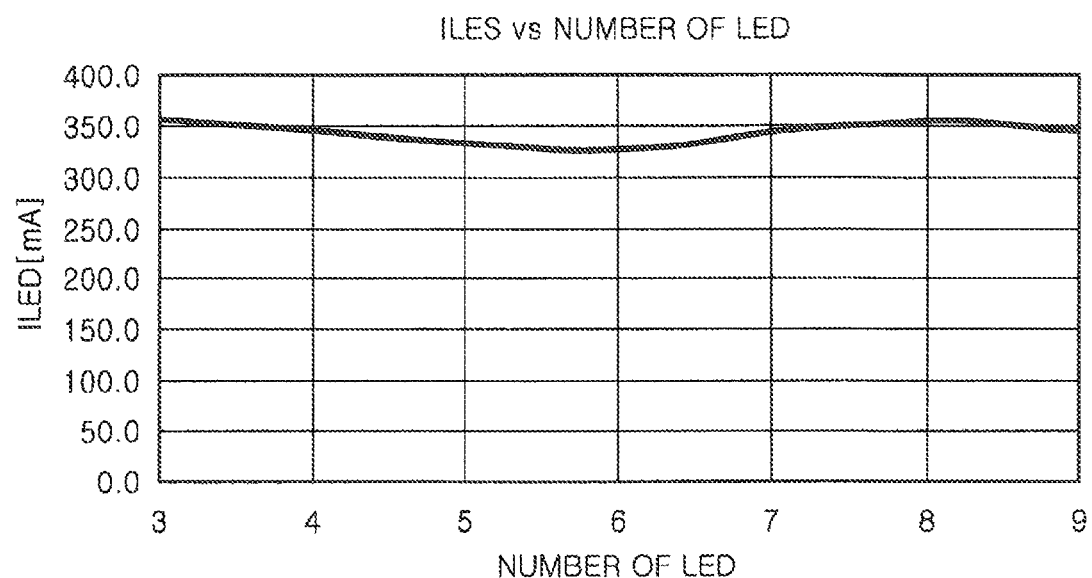
FIG. 16 is a resultant graph illustrating changes in an LED current depending on the number of LEDs, in accordance with embodiments.
Figure 17:
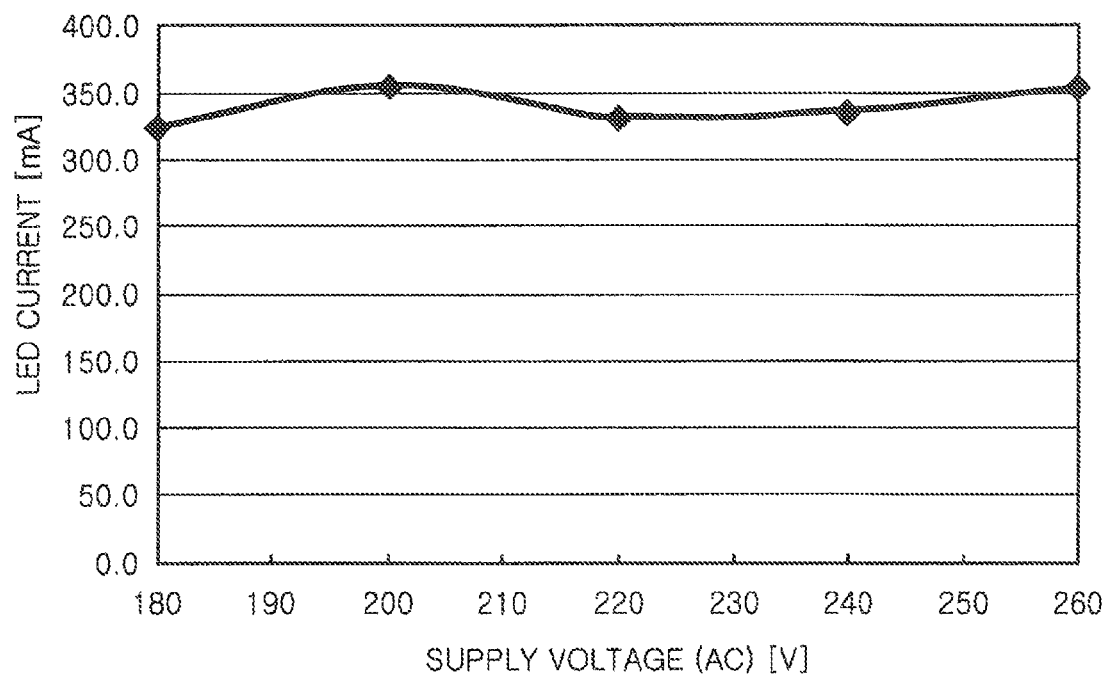
FIG. 17 is a resultant graph illustrating changes in an LED current depending on fluctuations in a power supply voltage, in accordance with embodiments.

FIGS. 16 and 17 are experimental graphs when, in the structure of FIG. 13 according to embodiments, power supply voltage Vsup is chopped and input for the first input signal INA, and the drain voltage is low-pass filtered and then applied for the second input signal INB.

In FIG. 16, the LED current is measured while changing the number of LEDs so as to experiment on a change in the LED current depending on a fluctuation in a load, in accordance with embodiments. Here, a 220 V alternating current is used as the power supply, and it can be understood that a current slightly fluctuates but is substantially controlled constant without affected by a fluctuation in a load. That is, the load regulation characteristic can be satisfied.

FIG. 17 is a resultant graph when a fluctuation in the LED current is measured while the power supply voltage changes from 180 V to 260 V in a state where a load is fixed, in accordance with embodiments. The LED current slightly fluctuates due to a fluctuation in power, but does not change to an extent such that LED brightness is affected. Therefore, it can be understood that the line regulation characteristic can be satisfied.

Figure 18:
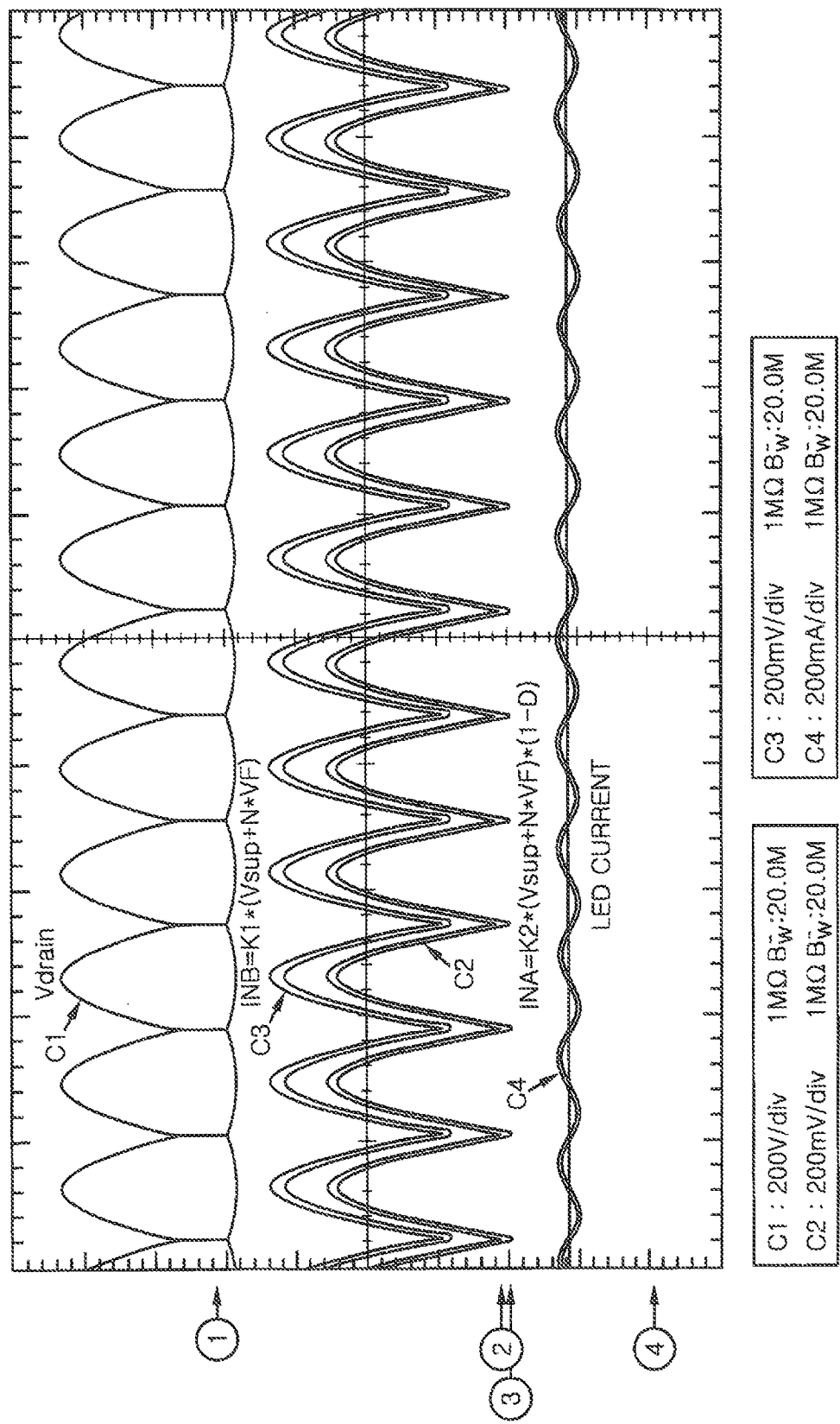
FIG. 18 is an experimental waveform chart showing an output of INA=Vdrain low pass filter and an output of INB=envelope detector, in accordance with embodiments.

FIG. 18 is an experimental waveform chart, in accordance with embodiments. It can be understood that the second input signal INB changes in a full-wave rectified sine wave form. That is, it can be considered that the constant α in Equation 24 changes sinusoidally. Accordingly, in this case, a high power factor can be achieved. The experiment result shows that the power factor of about 0.92 can be obtained. The reason for the LED current having not a sine wave form is that the LED current is smoothed using a capacitor. If there is no capacitor, a full-wave rectified sine wave form can be obtained.

In the above analysis, Equations 11 and 12 are derived taking into consideration an operation in a complete critical conduction mode, and various embodiments of four structures are proposed and an undesired term is removed, such that the line and load regulation characteristics are satisfied. Actually, as shown in FIGS. 5A and 5B, even when the current of the magnetizing inductance Lm becomes 0, the switching is resumed due to the resonance of the magnetizing inductance Lm and the parasitic capacitor Cp, and a period is present in which the current is maintained to be 0. Accordingly, it can be understood that the off-time increases compared to the operation in the critical conduction mode.

Accordingly, although it may not be considered that an operation is performed while completely satisfying Equations 11 and 12, the period in which the resonance of the magnetizing inductance Lm and the parasitic capacitor Cp occurs is relatively small with respect to the total off-time. Therefore, in the methods which are proposed through the above analysis, it can be considered that an operation is performed comparatively as expected, and actually, the line and load regulation effects can be confirmed.

According to embodiments, the LED driver and the isolated flyback converter may be implemented to control the driving of the LED through only primary-side control in the transformer without being affected by fluctuations in the LED load or fluctuations in the magnitude of the power supply voltage with no current sensor or insulation element, such as an opto-coupler, in the isolation-type LED driver circuit, thereby improving the power factor of the LED driver circuit and stably controlling the secondary-side current with no additional circuit on the secondary side regardless of a fluctuation in power or a fluctuation in load.

While the invention has been shown and described with respect to the embodiments, the present invention is not limited thereto. It will be understood by those skilled in the art that various changes and modifications may be made without departing from the scope of the invention as defined in the following claims.

What is claimed is:

1. An isolated flyback converter comprising:
    a snubber circuit configured to be connected to the primary side of a transformer, to which a power supply voltage is supplied, to substantially prevent at least one of overvoltage and overcurrent;
    a switching unit configured to have a source terminal connected to a switching current sensing resistor and a drain terminal connected to the snubber circuit and configured to be turned on or off; and
    a control unit configured to:
    detect a first input signal proportional to a fluctuation in the power supply voltage,
    detect a second input signal proportional to the envelope voltage of an output voltage of the switching unit when the switching unit is turned off,
    generate a signal inversely proportional to the maximum value of the first input signal and multiply the generated signal to the second input signal, and
    control a peak current of the switching unit to be proportional to the multiplication result of the signal inversely proportional to the maximum value of the first input signal and the second input signal such that a secondary-side current of the transformer is maintained substantially constant.

2. The isolated flyback converter of claim 1, wherein the isolated flyback converter is for an LED driver.

3. The isolated flyback converter of claim 1, comprising:
    a divider configured to attenuate the power supply voltage and supply the first input signal to the control unit; and
    an envelope detector configured to detect the envelope voltage of the output voltage of the switching unit and supply the second input signal to the control unit, wherein the envelope detector is connected in parallel to the drain terminal of the switching unit.

4. The isolated flyback converter of claim 3, wherein the control unit comprises:
    a peak voltage detector configured to output a peak voltage corresponding to the first input signal supplied through the divider;
    an operational amplifier configured to generate an output voltage using a value obtained by multiplying the peak voltage of the peak voltage detector and an operational amplification feedback result;
    a multiplier configured to multiply the output voltage of the operational amplifier and the second input signal supplied through the envelope detector to generate a reference voltage;
    a critical conduction mode timing generator configured to generate a set signal when an inductor current of the transformer is 0 A;
    a comparator configured to compare the voltage supplied through the switching current sensing resistor with the reference voltage of the multiplier, and output a logic signal according to the compared result; and
    a latch circuit configured to be set or reset in response to the logic signal of the comparator to generate an output signal at a high level or a low level.

5. The isolated flyback converter of claim 4, wherein when the voltage supplied through the switching current sensing resistor is higher than the reference voltage, the latch circuit is reset such that the switching unit is turned off.

6. An isolated flyback converter comprising:
    a snubber circuit configured to be connected to the primary side of a transformer, to which a power supply voltage is supplied, to substantially prevent at least one of overvoltage and overcurrent;

a switching unit having a source terminal connected to a switching current sensing resistor and a drain terminal connected to the snubber circuit, wherein the switching unit is configured to be turned on or off; and a control unit configured to:

detect a first input signal proportional to a signal obtained by low-pass filtering an output voltage of the switching unit, detect a second input signal proportional to the envelope voltage of the output voltage of the switching unit when the switching unit is turned off, and control a peak current of the switching unit to be proportional to the multiplication result of a signal inversely proportional to the maximum value of the first input signal and the second input signal such that a secondary-side current of the transformer is maintained substantially constant.

7. The isolated flyback converter of claim 6, wherein the isolated flyback converter is for an LED driver.

8. The isolated flyback converter of claim 6, comprising:

a low pass filter configured to be connected in parallel to the drain terminal of the switching unit to low-pass filter an output voltage of the switching unit, wherein the low pass filter is configured to supply the first input signal to the control unit; and an envelope detector configured to be connected in parallel to the drain terminal of the switching unit to detect the envelope voltage of an output voltage of the switching unit and supply the second input signal to the control unit.

9. The isolated flyback converter of claim 8, wherein the control unit comprises:

a peak voltage detector configured to output a peak voltage corresponding to the first input signal supplied through the low pass filter;

an operational amplifier configured to generate an output voltage using a value obtained by multiplying the peak voltage of the peak voltage detector and an operational amplification feedback result;

a multiplier configured to multiply the output voltage of the operational amplifier and the second input signal supplied through the low pass filter to generate a reference voltage;

a critical conduction mode timing generator configured to generate a set signal when the inductor current of the transformer is 0 A;

a comparator configured to compare the voltage supplied through the switching current sensing resistor with the reference voltage of the multiplier, wherein the comparator is configured to output a logic signal according to a comparison result; and a latch circuit configured to be set or reset in response to the logic signal of the comparator to generate an output signal at a high level or a low level.

10. The isolated flyback converter of claim 9, wherein when the voltage supplied through the switching current sensing resistor is higher than the reference voltage, the latch circuit is reset such that the switching unit is turned off.

* * * * *